March 4, 1952     W. B. PRIDY ET AL     2,587,893
PIPE CHUCK

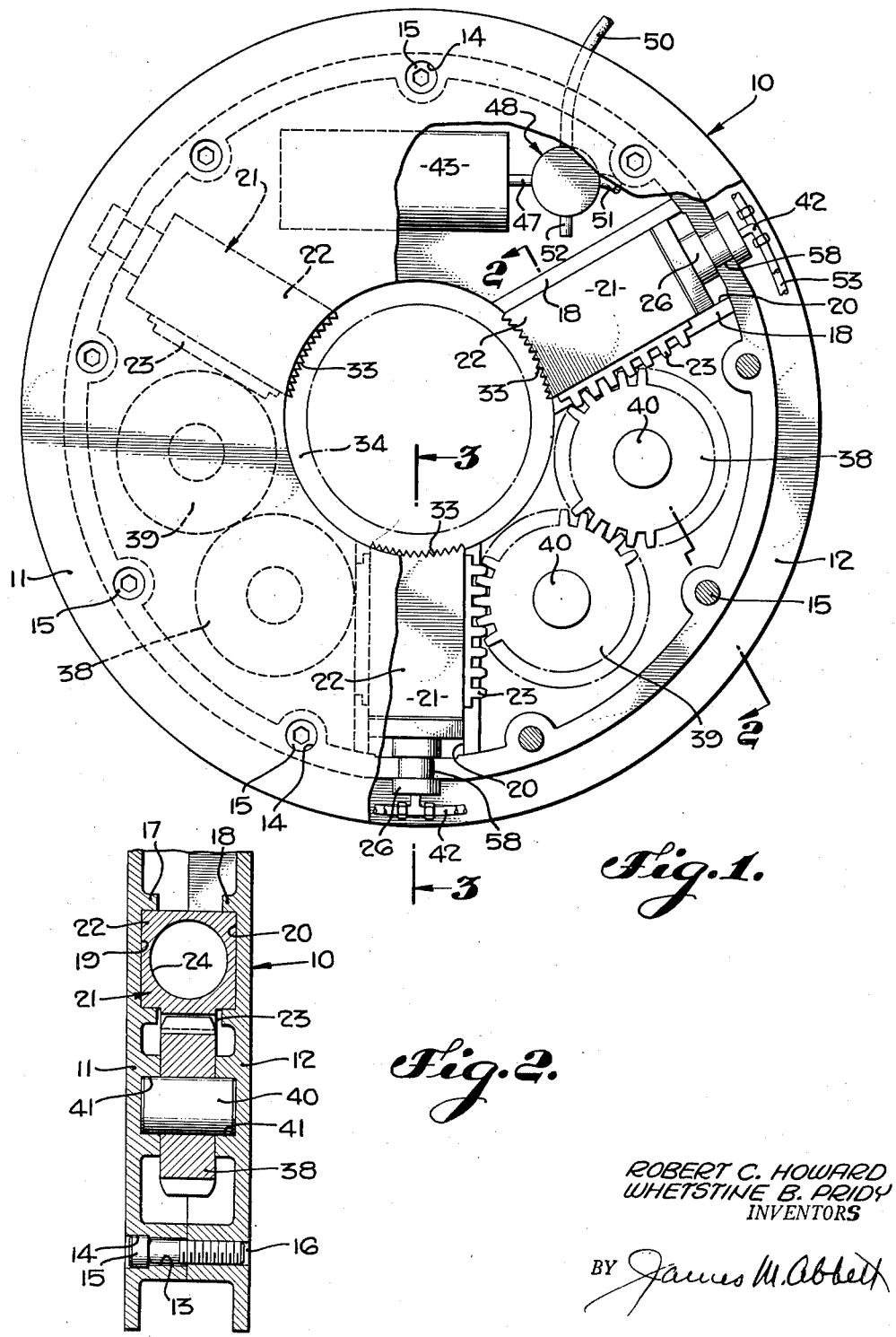

Filed Aug. 8, 1949     2 SHEETS—SHEET 2

ROBERT C. HOWARD
WHETSTINE B. PRIDY
INVENTORS

BY James M. Abbett
ATTORNEY

Patented Mar. 4, 1952

2,587,893

UNITED STATES PATENT OFFICE 2,587,893

PIPE CHUCK

Whetstine B. Pridy and Robert C. Howard,
Long Beach, Calif.

Application August 8, 1949, Serial No. 109,161

11 Claims. (Cl. 279—4)

This invention relates to a pipe chuck.

In machining and reconditioning the joints on oil well pipe casing and drill pipe it is necessary to provide a chuck through which the pipe may extend and which may be manipulated easily to grip the pipe and rotate the same. Various types of mechanism have been provided for manipulating the jaws of a rotary chuck. These, however, in most instances have required that the jaws must be set separately, and in cases where structures have been provided for setting the jaws simultaneously the mechanism associated therewith has been complicated and may easily get out of order. It is the principal object of the present invention, therefore, to provide a rotary chuck for pipe and other cylindrical objects in which a plurality of jaws are mounted upon a body member and which jaws may be set or released simultaneously by simple fluid pressure means.

The present invention contemplates the provision of a body structure adapted to be mounted upon a suitable driving head such as found on a lathe, and which body structure carries a plurality of radially movable jaws, said jaws being mechanically connected to insure their simultaneous movement in a desired direction, and fluid actuated to perform simultaneous movement of the jaws.

The invention is illustrated by way of example in the accompanying drawing in which:

Figure 1 is a view in end elevation showing the chuck with parts broken away to more clearly illustrate the mechanical connection between the chuck jaws.

Fig. 2 is a view in transverse section through the chuck as seen on the line 2—2 of Fig. 1 and illustrates the manner in which a chuck and its gear are mounted within the body structure.

Figure 4:
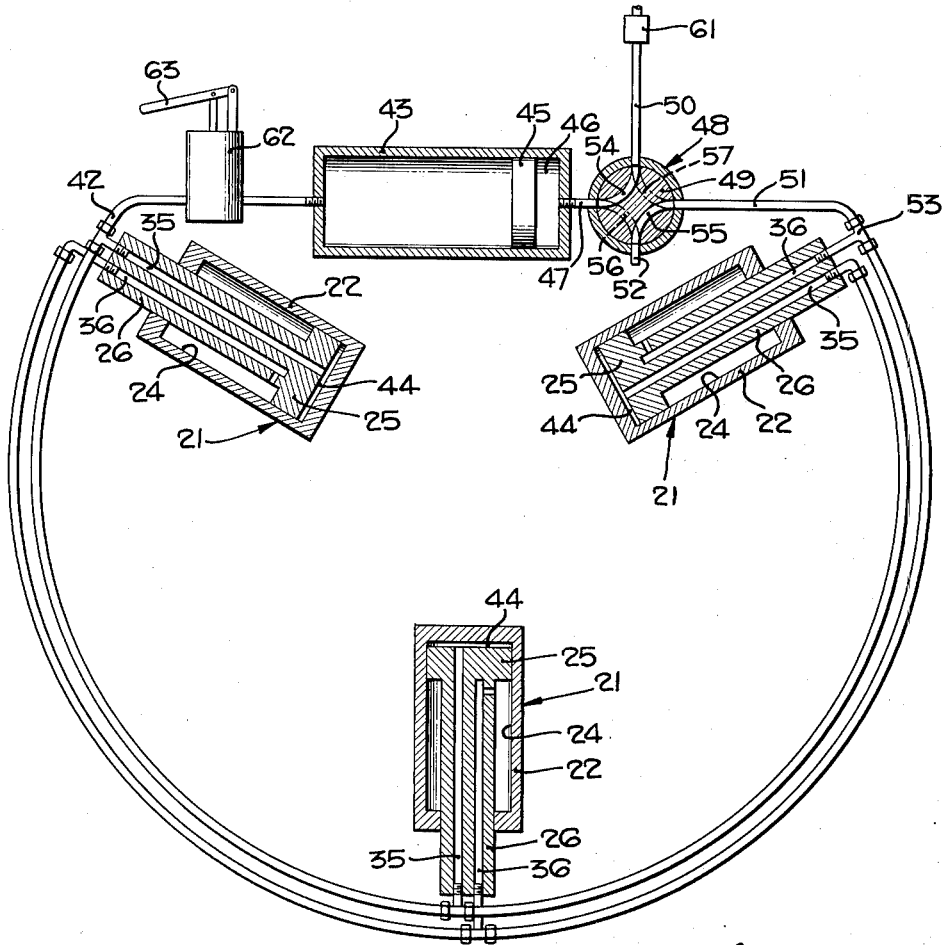
Fig. 4 is a view in diagram showing the fluid pressure system and particularly indicating the manner in which fluid pressure may be controlled to cause the jaws to move inwardly or outwardly as desired.

Referring more particularly to the drawing, 10 indicates a chuck body. As shown in Fig. 1 this body is circular, and as ilustrated in Fig. 2 the body is made in two corresponding halves which are joined together along a plane normal to the rotary axis of the chuck. The separate sections of the body member 10 are indicated in Fig 2 at 11 and 12. Here it will be seen that the section 11 is formed with cylindrical bores 13 which are counterbored at 14 and receive the head and an unthreaded portion of a cap screw 15. The threaded portion of the cap screw extends into a bore 16 formed in the body portion 12. Extending radially and projecting inwardly from the contiguous faces of the members 11 and 12 are ribs 17 and 18. The ribs are in pairs and are spaced a distance from each other to form guide channels 19 and 20. The guide channels 19 and 20 receive sides of the chuck jaw structures 21. These jaw structures 21 have an outer body 22 which is square in section and fits between the ribs 17 and 18 so that the jaw structure may move radially in a manner to be hereinafter described. Formed at one side of each jaw and between the ribs 17 and 18 is a gear rack 23, the purpose for which will be hereinafter described. Formed centrally of each of the jaws is a cylindrical bore 24. This bore receives a piston 25 and a stem 26. This piston is circumferentially grooved and is provided with a piston ring 27. The piston and its rod are designed to reciprocate within the bore 24. One end of the bore is closed by a solid cylinder head 28 against which the piston may move. The other end of the bore is fitted with a ring 29 through which the stem 26 of the piston rod extends. A central opening 30 is formed through the ring 29 to accommodate the stem 26. The wall of this opening is formed with a V-shaped groove 31 to receive a packing ring 32 which forms a fluid-tight seal against the stem 26. By reference to Fig. 1 of the drawing it will be seen that the inner face of the cylinder head 28 of each of the jaws 21 is arcuate and is serrated, as indicated at 33. The serrations extend vertically so that the teeth formed thereby will impinge against the circumference of a cylindrical member 34 and will grip the same so that the cylindrical member will rotate with the chuck.

Figure 3:
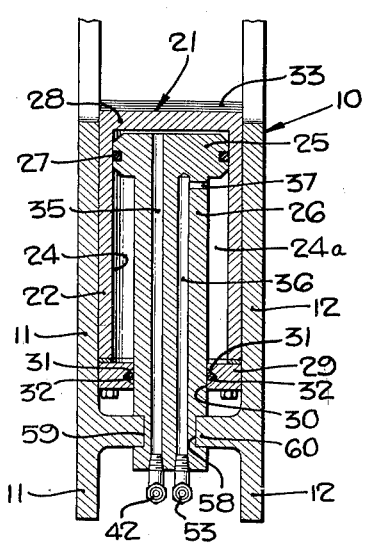
Fig. 3 is a view in central longitudinal section through one of the chuck jaws as seen on the line 3—3 of Fig. 1 and illustrates the fluid control for a jaw.

By reference to Fig. 3 it will be seen that there are two fluid ducts formed longitudinally of the stem 26. One is indicated at 35 and is shown as extending the entire length of the stem 26 and through the piston 25. The other duct is indicated at 36. This duct extends substantially through the stem 26 and has a lateral opening 37. By this arrangement fluid under pressure may either force the jaw 21 inwardly or outwardly as the hydraulic system is manipulated. Disposed between each pair of chuck jaws 21 is a pair of spur pinions 38 and 39. These gears are in mesh with each other and are also in mesh with the teeth of the gear racks 23 upon opposing sides of the chuck jaws. The spur pinions 38 and 39 are fitted with stub shafts 40 which are mounted within seats 41 on the opposing faces of the members 11 and 12 and thus provide a rotating support therefor when the cap screws have tightened the sections 11 and 12 in position, as shown in Fig. 2. The gear racks and the spur pinions are provided in order to insure simultaneous movement of the jaws 21. The drawing shows three jaws employed in the structure. It will be understood of course that any number of jaws may be used as desired.

By reference to Fig. 4 the control of the jaws is shown. Here it will be seen that the jaws are controlled by fluid pressure to be set or to be retracted. In order to set the jaws an incompressible fluid is delivered through a manifold 42 to the ducts 35 of each of the piston stems 26. The incompressible fluid, such as oil, is stored in a reservoir 43 and is forced through the manifold and the ducts to a pressure chamber 44. The reservoir 43 is preferably in the form of a cylinder and is fitted with a floating piston 45 which is interposed between the body of oil and a portion of the chamber at 46 which is filled with air or another fluid not readily miscible with oil. The air is delivered through a conduit 47 connected with the housing 48 of a two-way valve 49. A conduit 50 is connected with the housing 48 at an angle of 45° to the conduit 47. The conduit 50 is connected with a source of air under pressure which is being constantly delivered to the valve 49. The housing 48 is also fitted with conduits 51 and 52. The conduit 51 connects with an air manifold 53. This leads to the various ducts 36 of the piston stems 26. The conduit 52 leads to a vent by which the air may be vented from the cylinders. It will be seen by an examination of Fig. 4 that when the valve 49 is set with its passageway 54 in register with the openings for conduits 47 and 50 air under pressure will be delivered into the compartment 46 of the storage chamber 43, and at the same time air will be vented from the manifold 53 due to the fact that the passageway 54 is in register with the openings of conduits 51 and 52. The valve 49 is also provided with a communicating passageway 55. When the ends of this passageway are in register with the openings of conduits 51 and 52 the manifold 53 will vent and allow the jaws 21 to move outwardly as the air is vented from the chamber which occurs within the cylinder 24 and in the rear of a piston 25. In the event that the valve 49 is rotated a quarter of a turn passageways 56 and 57 which are formed in the valve will be placed in register with the conduit openings so that the air under pressure will be forced through the manifold 53, and as the oil is forced back through the manifold 42 to the reservoir the entrapped air within the chamber 46 will be forced outwardly through the vent conduit 52.

In operation of the present invention the chuck is assembled as shown in the drawing. It will be understood that its back plate is formed with a threaded hub by which it may be mounted upon the head-stock of a mandrel. The chuck is provided with a distributing head to which the manifold pipes 42 and 53 are connected. When the valve 49 is set in one of the directions previously described the air under pressure will impart pressure to the oil in the manifold 42 and will force the jaws 21 inwardly in convergent relation. Attention is directed to the fact that the stems 26 of the pistons are each formed with grooves 58 which are engaged by lugs 59 and 60 formed on the front and back plates 11 and 12 and are held so that the stems 26 and the pistons 25 cannot move. Thus when fluid under pressure is delivered to the chambers 24ª of the various cylindrical bores 24 the jaws will be forced inwardly into their gripping position. The air which is entrapped between the back face of each of the pistons and the rings 29 will be forced outwardly through the conduits 53 and to the vent. When it is desired to retract the chuck jaws 21 the position of the valve 49 is reversed so that air under pressure will act between the back face of the pistons 25 and the rings 29 to force the jaws outwardly. It might occur that the fluid pressure would act differently in different cylinders. Compensation is made for this action and movement by the pinions 38 and 39 and the racks 23 which will cause the chuck jaws to move simultaneously.

The chuck may be set while in its non-rotating position by attaching a conduit which is connected to a source of air pressure. The attachment is made by a quick connecting coupling generally indicated at 61 in Fig. 4 of the drawing. When it is desired to set the chuck by excessive pressure an auxiliary pump 62 is provided in the manifold line 52 and is operated by a pump handle 63. This insures that the incompressible fluid will be given additional compression to force the jaws toward their set position when the handle 63 is manipulated.

It will thus be seen that the chuck structure here disclosed provides simple and effective means to grip a member to be rotated by a series of simultaneously moving jaws which may be set by fluid pressure uniformly, and which will insure that the piece of material may be easily released when desired, the structure being simple in construction and operation.

While we have shown the preferred form of our invention as now known to us, it will be understood that various changes may be made in combination, construction and arrangement of parts by those skilled in the art, without departing from the spirit of the invention as claimed.

Having thus described our invention, what we claim and desire to secure by Letters Patent is:

1. A rotary chuck comprising a body member, radial guideways thereon, a plurality of radially disposed piston structures fixed to extend longitudinally of the guideways, and a jaw slidably mounted in each of said guideways and formed with a cylinder to receive a complementary piston structure, said cylinder being closed at its inner end, there being a duct in said piston structure for delivering fluid under pressure to the space between the closed end of the cylinder and the piston to force the jaw inwardly.

2. The structure of claim 1 including racks on said jaws and gears meshing with said racks and with each other whereby the jaws will move in unison.

3. A rotary chuck structure comprising a body formed with radial guideways therein, a piston stem fixed in each of said guideways and extending longitudinally thereof, a piston carried by each stem, a chuck jaw movable in each of said guideways and adapted to set against an object to be gripped, cylinders provided on said jaws to slidably receive said pistons, there being a fluid duct extending through each of said stems and pistons whereby fluid under pressure may be delivered to the inner ends of each of the cylinders to force the jaws to a setting position.

4. The structure of claim 3 including means carried by each of the jaws and sealing the same around each of the piston stems, there being a fluid duct in each stem communicating with the space between its associated piston and sealing means whereby the jaws may be retracted by fluid under pressure delivered to said fluid ducts.

5. In a rotary chuck having a plurality of radially moving jaws, piston and cylinder means associated with each of said jaws, said pistons being fixed against movement and the cylinder being associated with the jaws whereby the jaws and pistons may have relative movement, and a manifold communicating with all of the piston and cylinder units and delivering fluid under pressure from a pressure source to force the jaws inwardly.

6. In a rotary chuck having a plurality of radially moving jaws, piston and cylinder means associated with each of said jaws, said pistons being fixed against movement and the cylinder being associated with the jaws whereby the jaws and pistons may have relative movement, a manifold communicating with all of the piston and cylinder units and delivering fluid under pressure from a pressure source to force the jaws inwardly, and a second manifold communicating with all of the jaw and piston units whereby the delivery of fluid under pressure through said second manifold will act to retract the jaws.

7. In a rotary chuck having a plurality of radially moving jaws, piston and cylinder means associated with each of said jaws, said pistons being fixed against movement and the cylinder being associated with the jaws whereby the jaws and pistons may have relative movement, a manifold communicating with all of the piston and cylinder units and delivering fluid under pressure from a pressure source to force the jaws outwardly, and auxiliary fluid pressure means associated with said manifold to create fluid under pressure separate from the fluid under pressure provided by the pressure source.

8. A rotary chuck comprising a body member, radial guideways thereon, a plurality of radially disposed piston structures fixed on said body member at their outer ends to extend radially inwardly longitudinally of said guideways, a plurality of jaw structures slidably mounted in said guideways each of which includes a cylinder slidably receiving the piston structure in its respective guideway and a jaw formed on the head of said cylinder, and means for delivering fluid under pressure through said piston structures into said cylinders to shift said jaws inwardly.

9. A combination as in claim 8 in which the opposite ends of said cylinders from said jaws have heads which make a sliding fluid tight fit with said piston structures whereby said cylinders have expansive chambers at both their inner and outer ends, there being ducts for admitting fluid through said piston structures into the outer chambers of said cylinders to retract said jaws outwardly.

10. A combination as in claim 9 in which a hydraulic pressure system is provided to supply a hydraulic pressure medium to the inner chambers of said cylinders to set said jaws, and a gaseous fluid pressure system is provided to supply a gaseous fluid pressure medium to the outer chambers of said cylinders to retract said jaws, and means for coordinately controlling said two pressure systems to selectively set or retract said jaws.

11. A combination as in claim 10 having means to apply gaseous fluid pressure from said gaseous fluid pressure system to the hydraulic pressure medium in said hydraulic pressure system to cause said jaws to be set and to maintain said jaws in set relation, said control means being selectively operable to retract said jaws by relieving said hydraulic system from pressure from the gaseous fluid pressure medium of said gaseous fluid pressure system, while applying the latter to the outer chambers of said cylinders.

WHETSTINE B. PRIDY.
ROBERT C. HOWARD.

REFERENCES CITED

The following references are of record in the file of this patent:

UNITED STATES PATENTS

| Number | Name | Date |
|---|---|---|
| 1,311,665 | Peck | July 29, 1919 |
| 1,441,088 | Hofstetter | Jan. 2, 1923 |
| 1,837,688 | Sande | Dec. 22, 1931 |
| 2,158,058 | Godfriaux | May 16, 1939 |
| 2,451,705 | Adair | Oct. 19, 1948 |
| 2,511,827 | Adair | June 20, 1950 |

FOREIGN PATENTS

| Number | Country | Date |
|---|---|---|
| 576,150 | Great Britain | Mar. 21, 1946 |